United States Patent [19]
Breuer et al.

[11] Patent Number: 5,662,376
[45] Date of Patent: Sep. 2, 1997

[54] FORCE DISSIPATION SEAT PEDESTAL

[75] Inventors: Kurt F. Breuer, Marinette, Wis.; Ronald L. Young, Menominee, Mich.

[73] Assignee: Erda, Inc., Peshitgo, Wis.

[21] Appl. No.: 495,218

[22] Filed: Jun. 27, 1995

Related U.S. Application Data

[63] Continuation-in-part of Ser. No. 93,771, Jul. 19, 1993, Pat. No. 5,482,351.

[51] Int. Cl.$^6$ ........................................................ B60N 2/42
[52] U.S. Cl. ................................... 297/216.2; 297/216.16; 296/68.1
[58] Field of Search ............................. 297/216.1, 216.17, 297/216.2, 216.16, 216.19, 302.3, 303.1, 303.3, 452.12, 452.55; 296/68.1

[56] References Cited

U.S. PATENT DOCUMENTS

| | | | |
|---|---|---|---|
| 2,144,233 | 1/1939 | Stewart | 297/216.1 |
| 3,354,990 | 11/1967 | Stahl . | |
| 3,460,791 | 8/1969 | Judd . | |
| 3,531,154 | 9/1970 | Fleche . | |
| 4,440,441 | 4/1984 | Marrujo . | |
| 4,526,421 | 7/1985 | Brennan et al. | 297/452.21 |
| 4,718,719 | 1/1988 | Brennan . | |
| 5,152,578 | 10/1992 | Kiguchi | 297/216.16 |

FOREIGN PATENT DOCUMENTS

| | | | |
|---|---|---|---|
| 1966727 | 10/1973 | Germany | 297/216.19 |
| 0363621 | 12/1931 | United Kingdom | 297/302.1 |

OTHER PUBLICATIONS

Aerospace Standard, SAE AS8049.

*Primary Examiner*—Peter M. Cuomo
*Assistant Examiner*—Anthony D. Barfield
*Attorney, Agent, or Firm*—Godfrey & Kahn, S.C.

[57] ABSTRACT

The present invention generally relates to a force dissipation seat pedestal that is particularly useful in aircraft seat design. The seat includes two rear supports having multi-strip legs, two front supports having unibody legs, and two gussets located proximal the front legs. One end of each leg is pivotally secured to the pedestal. An other end of each leg is pivotally secured to the floor of the aircraft via a hinged floor mount assembly. The front and rear supports and gussets are designed to maintain their shape during normal operation of the aircraft, but to deform during an emergency landing to reduce the forces transmitted to an occupant of the aircraft seat.

26 Claims, 13 Drawing Sheets

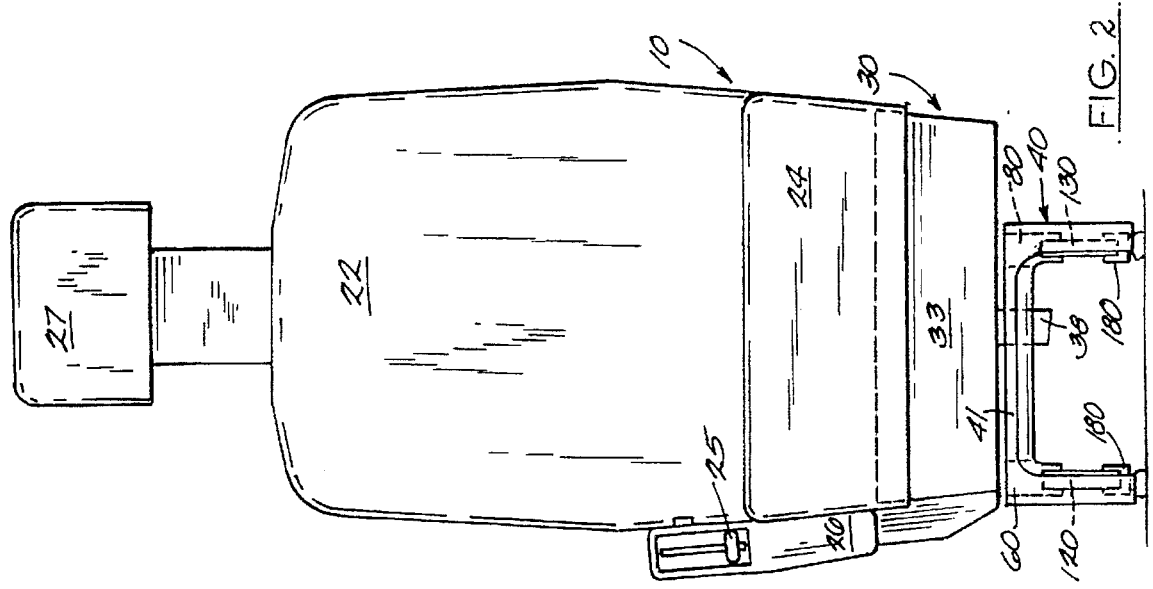

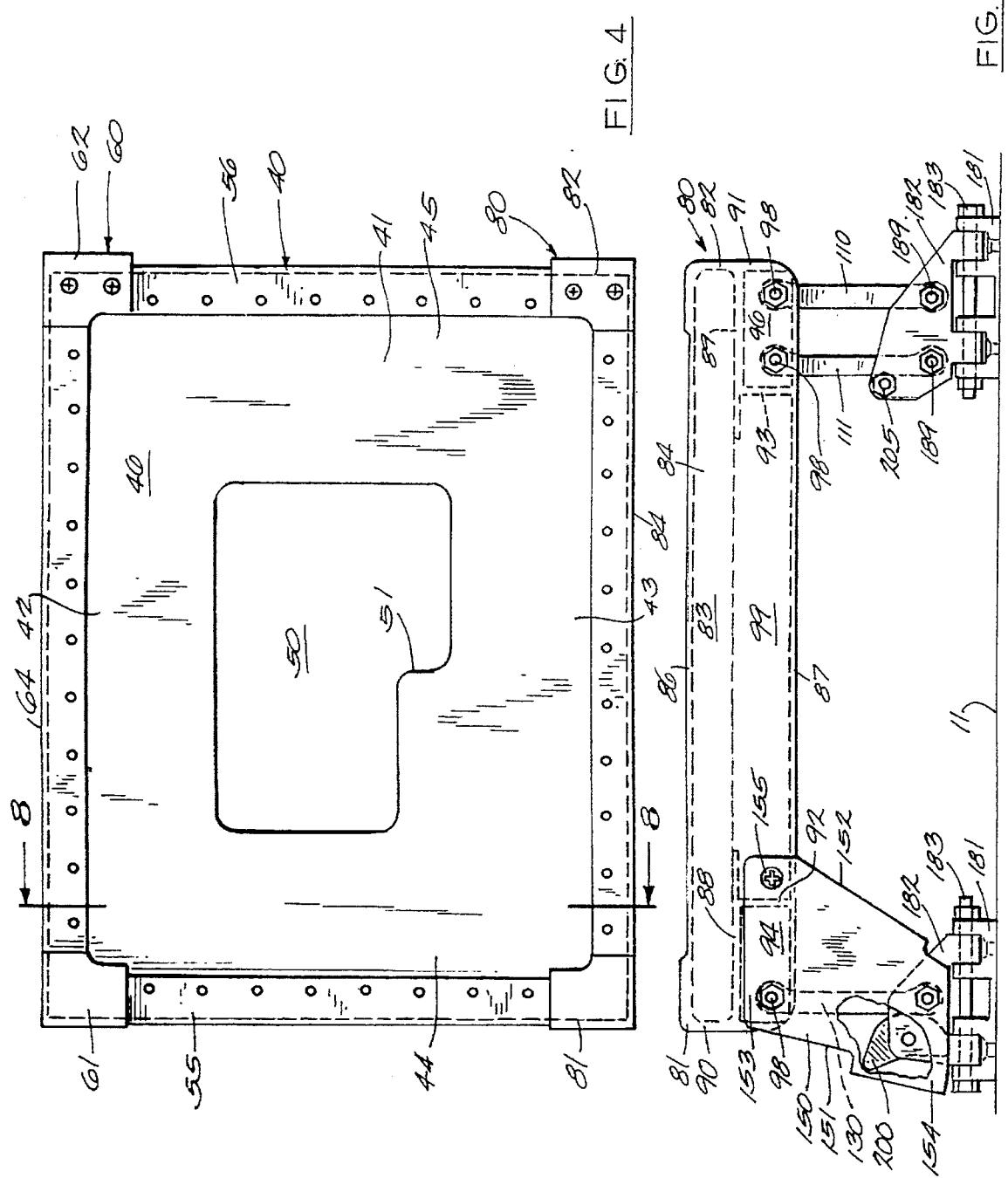

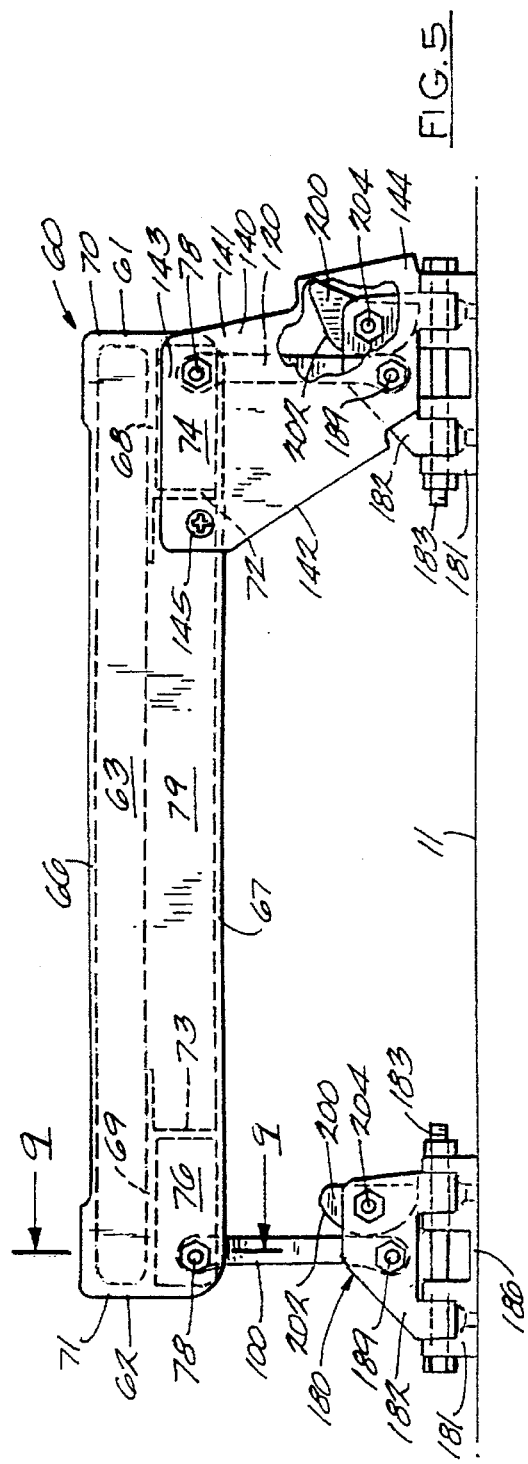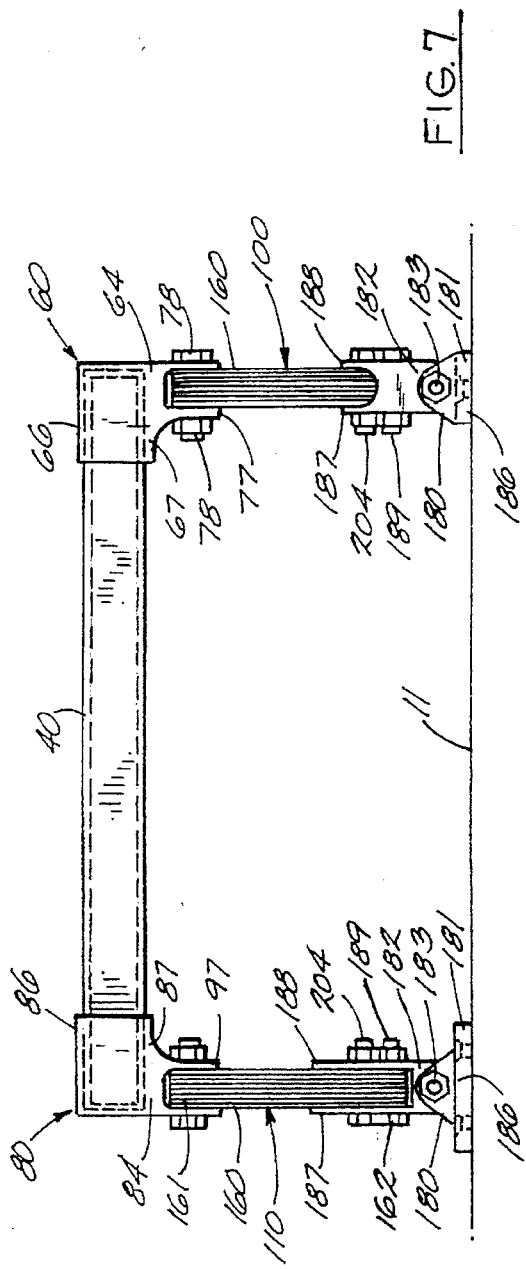

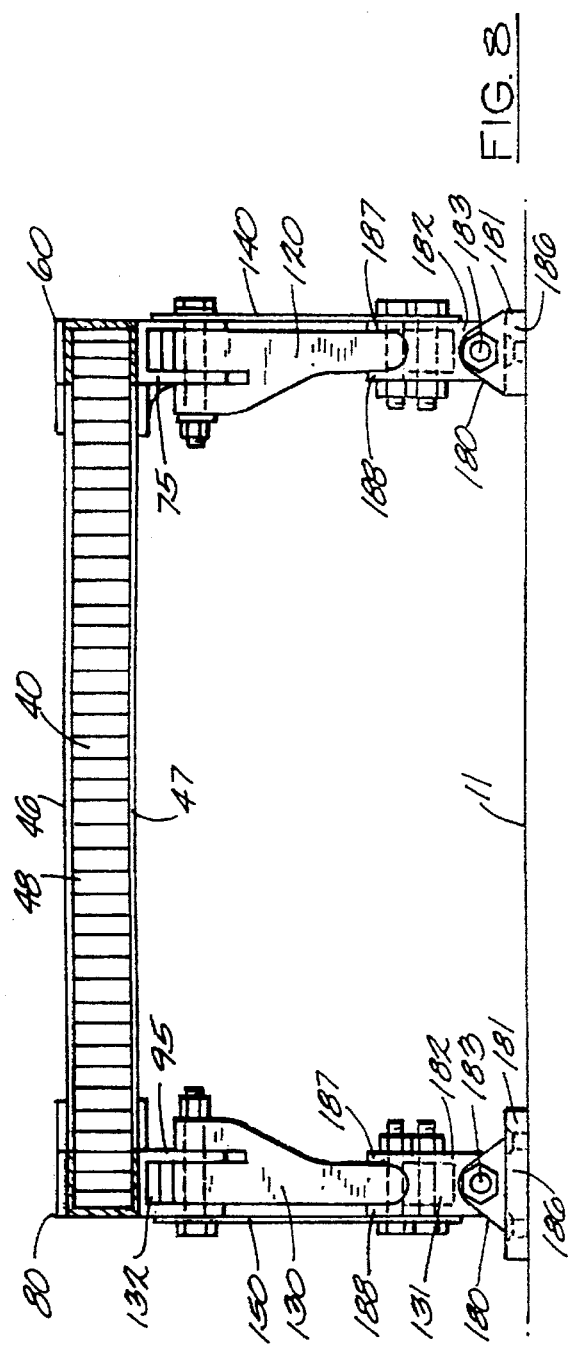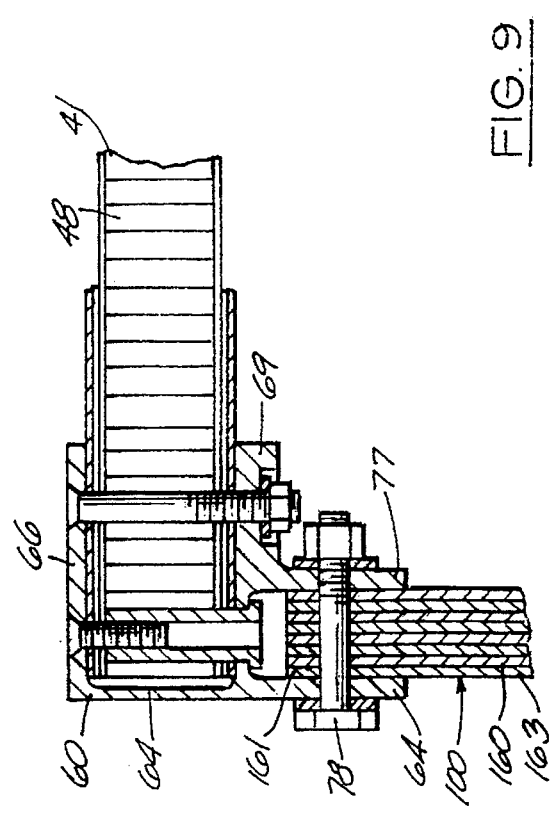

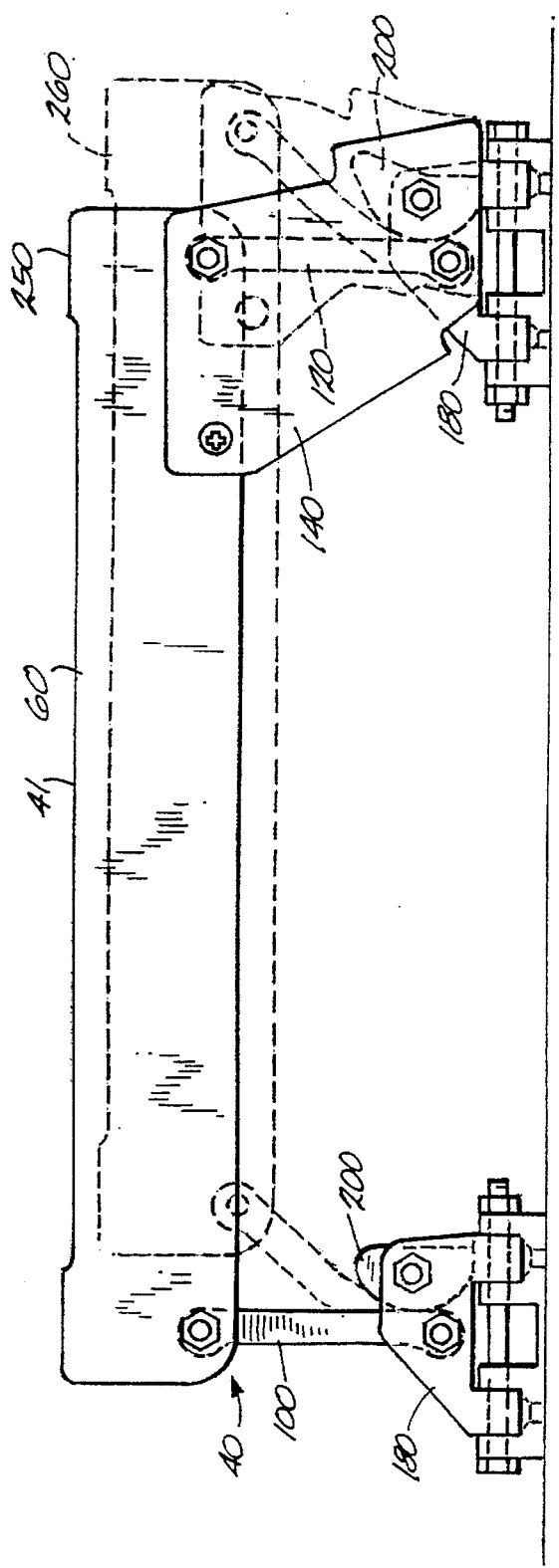

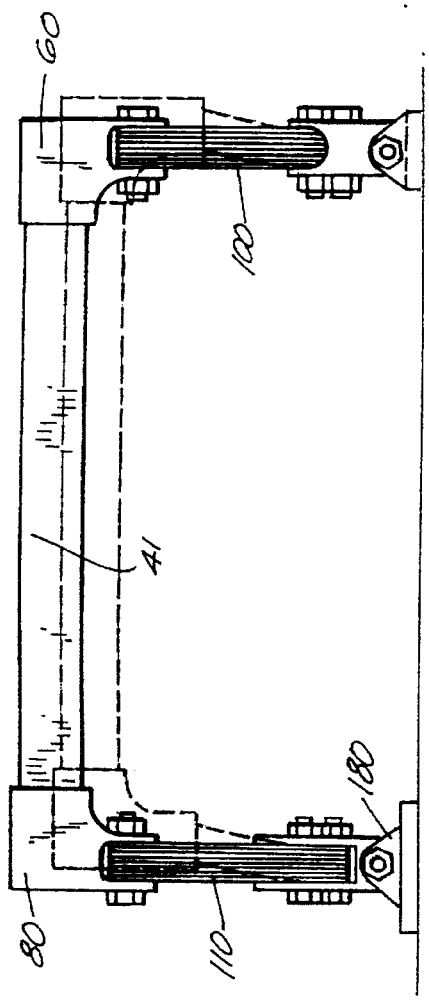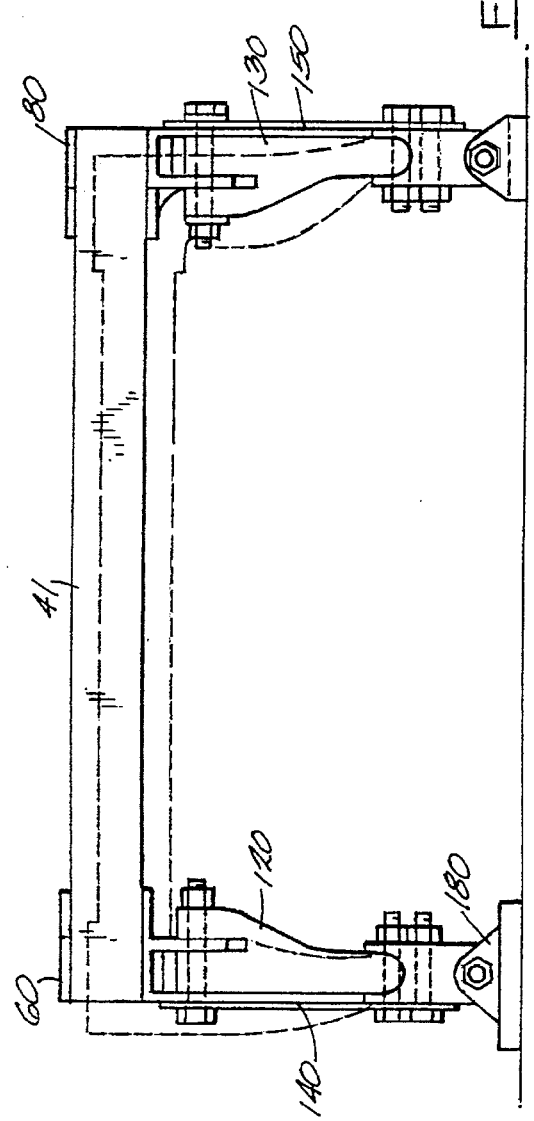

FORCE DISSIPATION SEAT PEDESTAL

CROSS-REFERENCE TO RELATED APPLICATION

This is a Continuation-In-Part of U.S. patent application Ser. No. 08/093,771 filed Jul. 19, 1993, now U.S. Pat. No. 5,482,351.

TECHNICAL FIELD

The present invention generally relates to a force dissipation seat and more particularly to an aircraft seat pedestal designed to deform during an emergency landing to dissipate some of the energy and forces that would otherwise be imparted on an occupant of the seat.

BACKGROUND

A primary goal of aircraft design today is the safety of the passengers and crew, particularly in the event of an emergency landing. The importance of this goal can be seen throughout the design of the aircraft including its seats. Some illustrative aircraft seat designs are shown in U.S. Pat. Nos. 4,440,441; 3,531,154; 3,460,791 and 3,354,990 the contents of which are incorporated by reference. Industry standards have been adopted to maintain consistent seat performance to enhance occupant safety during the event of an emergency landing.

One standard adopted by the aircraft industry to regulate seat design is Aerospace Standard SAE AS8049 entitled Performance Standard for Seats in Civil Rotorcraft and Transport Airplanes. This standard encompasses a variety of design considerations. The aircraft seat must be capable of withstanding a simulated emergency landing that produces a predetermined impact pulse curve. This impact pulse curve depicts the forces transmitted to the seat during the simulated emergency landing. The seat must dissipate some of the energy and forces that would otherwise be transmitted to the occupant. SAE AS8049 specifies that the occupant should not experience spine compression of greater than 1500 pounds or a shoulder harness load of greater than 1750 pounds during the simulated emergency landing test. The standard also contains other requirements, such as maximum permanent deformation, hazardous projections, fire protection and workmanship that must be incorporated into the seat design.

A main problem in aircraft seat design is meeting the impact pulse requirements, such as the maximum force and spine compression requirements, set forth in Aerospace Standard SAE AS8049. This problem is aggravated by the fact that the soft cushions may increase the level of forces experienced by the occupant in some situations.

Another significant problem in aircraft seat design is that the seat must withstand the simulated floor warping criteria of Aerospace Standard SAE AS8049. This standard requires the seat to withstand significant aircraft floor warping that may arise from the forces associated with an emergency landing. The seat must be able to withstand floor warping equated to a 10° roll, 10° pitch of the floor tracks. A 10° yaw of the aircraft is also included during the test.

A further problem in aircraft seat design is meeting the deflection requirements set forth in Aerospace Standard SAE AS8049. The legs of the seat should not crush more than a prescribed amount in order to prevent harm to the occupants of the aircraft. Longitudinal, lateral and rotational deflection must all be kept within the tolerances set forth in Aerospace Standard SAE AS8049.

A still further problem in aircraft seat design is that conventional aircraft come in variety of sizes and shapes, and for a variety of functions. Aircraft range from single engine sport planes, to large airliners or supersonic fighter aircraft, to helicopters. The seat design should be capable of being installed in as many aircraft as possible.

A still further problem in aircraft seat design is producing a seat that is both economical to manufacture and install in conventional aircraft. Typically, the more substantial the changes to an existing aircraft seat the more expensive the new design will be to manufacture. Significant changes to the existing seat design may also prevent the seat from fitting into an existing aircraft floor plan, thus rendering the design unusable.

The present invention is provided to solve these and other problems.

SUMMARY OF THE INVENTION

The present invention generally relates to a force dissipation seat and seat pedestal that are particularly useful in an aircraft. The seat pedestal includes a warpable pedestal top, deformable unibody legs and gussets located in the front of the pedestal and deformable multi-strip legs located in the rear of the pedestal. One end of each leg is pivotally secured to the pedestal top and the other end of each leg is pivotally secured to a hinged floor mount assembly. The pedestal top, legs and gussets are designed to maintain their shape during normal operation of the aircraft, and to plastically deform during an emergency landing to dissipate some of the energy and forces that would otherwise be imparted on a person sitting in the aircraft seat.

A main advantage of the present aircraft seat and seat pedestal invention is that it meets the requirements of Aerospace Standard SAE AS8049. The legs and gussets of the pedestal deform in such a way that the person in the seat should experience spine compression and maximum shoulder harness load within the limits set by Aerospace Standard SAE AS8049. The rear multi-strip legs, front unibody legs and gussets combine to deform in such way that they significantly dissipate some of the energy and forces that would otherwise be imparted on the occupant. The seat pedestal should provide improved protection to the passengers and crew of an aircraft in the event of an emergency landing.

Another significant advantage of the aircraft seat design is that the seat can withstand the simulated floor warping criteria of Aerospace Standard SAE AS8049. The seat can withstand floor warping equated to a 10° roll, 10° pitch of the floor tracks and 10° yaw of the aircraft during a simulated emergency landing.

A further advantage of the present aircraft seat pedestal invention is that the pedestal meets the deflection requirements of Aerospace Standard SAE AS8049. The longitudinal, lateral and rotational deflection of the pedestal and its associated seat pan and seat cushion are within the limits set by this standard. The pedestal design should also meet the hazardous projection, fire protection and workmanship requirements of this standard.

A still further advantage of the present invention is that the seat pedestal can be relatively easily incorporated into existing aircraft seat designs without complicated modifications to the aircraft seat or seat pan. This reduces the production costs associated with the invention.

A still further advantage of the present invention is that the seat pedestal can be readily installed in conventional aircraft. The main body, legs, gussets and mounting posts of the pedestal fit in substantially the same area as existing seat pedestals, and can be easily secured to the floor of conventional aircraft. Expensive modifications to aircraft floor plans are not necessary.

A still further advantage of the present invention is to provide a seat that may be manufactured as original equipment, or alternatively may be manufactured in the nature of a retrofit. An aircraft seat having a conventional seat pedestal can be readily retrofitted with the present seat pedestal invention.

A still further advantage of the present invention is that it provides a seat having a force dissipation pedestal that is lightweight, compact, efficient and economical in price.

A still further advantage of the present invention is that it provides a seat that is characterized by ease of use and simplicity of construction.

Other features and advantages of the invention will be apparent from the following specification taken in conjunction with the following drawing.

BRIEF DESCRIPTION OF THE DRAWINGS

FIG. 1 is a right side elevation view of an aircraft seat having a seat cushion, a seat pan, and a seat pedestal that includes a pedestal top, side channels, legs, gussets and hinged floor mount assemblies.

FIG. 2 is a front elevation view of the aircraft seat of FIG. 1.

FIG. 4 is a top view of the pedestal showing the pedestal top, side channels, end channels and pedestal opening.

FIG. 5 is a right side elevation view of the pedestal having a front support composed of one unibody leg and a gusset, and a rear support composed of one multi-strip leg.

FIG. 6 is a left side elevation view of the pedestal having a front support composed of one unibody leg and a gusset, and a rear support composed of two multi-strip legs.

FIG. 7 is a rear elevation view of the pedestal having right and left multi-strip legs.

FIG. 8 is a front sectional view of the pedestal taken along line 8—8 of FIG. 4 showing the right and left unibody legs and gussets.

FIG. 9 is an enlarged sectional view taken along line 9—9 of FIG. 5 showing a connection between the multi-strip leg and the side channel of the pedestal.

FIG. 19 is a right side, elevation view of the pedestal showing the pedestal in solid lines for its normal operating position and in phantom lines for its energy absorbing position after completion of one of the tests.

FIG. 20 is a rear, elevation view of the pedestal in FIG. 19.

FIG. 21 is a front, elevation view of the pedestal of FIG. 19.

DETAILED DESCRIPTION

Figure 3:
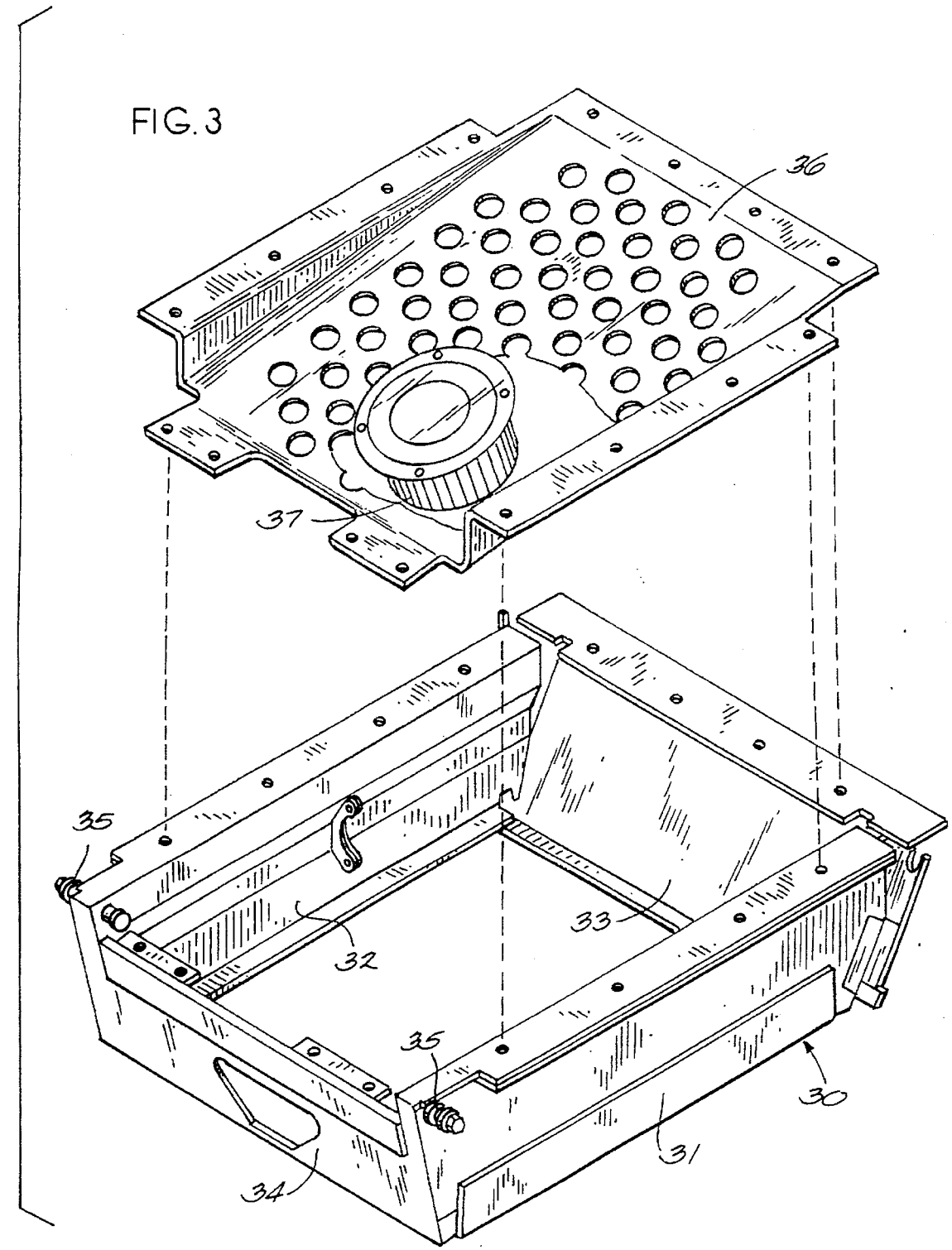
FIG. 3 is an exploded perspective view of the seat pan.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the embodiment illustrated.

The invention relates to a force dissipation seat generally indicated by reference number 10 in FIGS. 1 and 2. The seat 10 is shown mounted to a floor 11 of an aircraft, and moves in a path of travel 12 corresponding to that of the aircraft. The seat 10 generally includes a seat cushion portion 20 for supporting an occupant, a seat pan 30 for housing seat positioning components, and a pedestal 40 for supporting the seat at a desired height and mounting the seat to the aircraft floor 11. Although the force dissipation seat 10 is shown and described as being a passenger seat of the type installed in a commercial airplane, it should be understood that the invention could relate to seat designs for a variety of aircraft applications or vehicles, such as helicopters, trains, automobiles, trucks, etc. In addition, although the seat 10 is shown and described as facing the direction of the aircraft's path of travel 12, it should be understood that the seat cushion portion 20 and seat pan 30 could face in other directions without departing from the invention.

The seat cushion portion 20 includes a back rest 22 and a seat rest 24 for supporting the weight of an occupant. The back rest 22 pivots with respect to the seat rest 24. The seat cushion portion 20 includes a lever 25 located in an arm rest 26 so that an occupant can selectively adjust the seat into a variety of swivel, translational motions. The back recline is controlled by a button on the inside of the arm. The back rest 22 also includes a head rest 27. Shoulder and lap belts (not shown) are also provided.

As best shown in FIG. 3, the seat pan 30 includes right and left side walls 31 and 32, and front and rear end walls 33 and 34. The right and left side walls 31 and 32 each include a post 35 for pivotally mounting back rest 24. Walls 31–33 each have an upper flange for supporting seat rest 22. In addition, walls 31–34 each have a continuous lower panel surface for engaging the pedestal 40. The seat pan 30 houses a positioning mechanism with a post 38 (shown in FIGS. 1 and 2) that rotatably connects the seat pan 30 to the pedestal 40. This mechanism is more fully described in U.S. Pat. No. 4,671,572.

The seat pan 30 includes a perforated web 36 that supports the seat rest 24 of seat cushion portion 20. The web 36 is made of high strength aluminum and has a thickness of about 0.016 inches. The perforated web 36 includes a 1½ inch thick honeycomb panel 37 positioned under the perforated web in the area of the occupants spine. The honeycomb panel 37 has a light weight honeycomb core and a fiberglass skin. The web 36 and honeycomb panel 37 deform under test conditions to absorb energy and aid in preventing spine compression in excess of 1,500 pounds. These components also deform under loads that exceed test conditions to provide reserve energy absorbing capabilities.

As shown in FIGS. 4–9, the pedestal 40 includes a top portion having a pedestal top 41. Lateral channels 55 and 56 and side channels 60 and 80 are secured to pedestal top 41. Legs or supports 100, 110, 120 and 130 and gussets 140 and 150 extend downwardly from the side channels 60 and 80. The legs are secured to the aircraft floor 11 by hinged floor mount assemblies 180. Each component is made of high strength aircraft quality aluminum. Static and dynamic forces imparted by the aircraft on the occupant, or by the occupant on the aircraft, are transmitted from the portion 20 to the seat pan 30, through the pedestal top 41, through side channels 60 and 80 to legs 100, 110, 120, 130 and gussets 140 and 150, through floor mount assemblies 180, and ultimately to the aircraft floor 11, and visa versa. As discussed below, the pedestal top 41, legs 100, 110, 120 and 130 and gussets 140 and 150 are designed to plastically deform when exposed to predetermined conditions such as forces in excess of a given magnitude that may occur during an emergency landing. This deformation dissipates some of the energy and forces that would otherwise be imparted on the occupant.

As is best shown in FIGS. 4 and 8, the pedestal top 41 has right and left sides 42 and 43, front and rear ends 44 and 45, and upper and lower surfaces 46 and 47. The pedestal top 41 contains an opening 50 for receiving positioning mechanism post 38. (See FIG. 1). Pedestal top 41 has a honeycomb core 48 that is robustly sized to carry the load of the seat 10 and occupant without permanent deformation during normal operation conditions. An epoxy-based material (not shown) is used to fill the honeycomb core 48 around the perimeter of opening 50. The epoxy-based material stiffens the honeycomb core 48 around opening 50 and provides corrosion protection to the exposed core. Lateral channels 55 and 56 are made of 7075-T6 alclad aluminum sheet metal and shaped to snugly engage the entire length of pedestal ends 44 and 45. The lateral channels 55 and 56 are riveted to pedestal ends 44 and 45, and stiffen those ends and protect them from tearing and corroding. A sheet metal housing 49 is provided to enclose the sides of pedestal 40.

Pedestal top 41 may function as an energy absorbing component during an emergency landing. The surfaces 46 and 47 of the pedestal top 41 will warp and plastically deform its honeycomb core 48 when exposed to forces in excess of a given magnitude. Opening 50 is shaped to form an abutment 51 that provides reserve energy absorbing capabilities in the event of extreme conditions that exceed test criteria. Post 38 may strike and crush abutment 51 to absorb energy during an extreme emergency landing or crash condition.

Side channels 60 and 80 are made of 7075-T6 aluminum bar stock and machined to snugly engage the entire length of pedestal sides 42 and 43, respectively. Side channels 60 and 80 are robustly sized to carry the load imparted on pedestal top 41, and distribute that load to supports 100, 110, 120 and 130 and gussets 140 and 150. Side channels 60 and 80 maintain the rigidity and integrity of the sides 42 and 43 of pedestal top 41, and provide a platform for mounting supports 100, 110, 120, and 130 and gussets 140 and 150. Side channels 60 and 80 are not intended to function as energy or force dissipating components.

Right side channel 60 is shown in FIG. 5. The channel 60 is an integral piece of material with front and rear ends 61 and 62. A first pocket 63 is machined out of the inside surface of channel 60 for snugly receiving the right side 42 of pedestal top 41. Channel 60 is machined to form a rectangular outer plate 64 from which a number of inwardly projecting flanges extend, such as upper flange 66, lower flange 67, middle flanges 68 and 69, end flanges 70 and 71, and stiffening flanges 72 and 73. Outer plate 64 combines with upper flange 66, middle flanges 67 and 68 and end flanges 70 and 71 to snugly receive pedestal top 41. A second pocket 74 is machined out of a lower surface of the front end 61 of channel 60 to form downwardly projecting inner plate 75 as shown in FIG. 8. A third pocket 76 is formed out of the lower surface of the rear end 62 of channel 60 to form downwardly projecting inner plate 77 as shown in FIG. 7. The second and third pockets 74 and 76 are sized to snugly receive unibody leg 120 and multi-strip leg 100, respectively. Outer plate 64 has one hole in each of its ends 61 and 62, each hole being linearly aligned with a hole in inner plate 75 or 77, respectively. A bolt 78 is inserted through each hole to pivotally secure legs 100 and 120 in place. A fourth pocket 79 is machined out of the inside surface of channel 60 to reduce the weight of the channel. Stiffening flanges 72 and 73 join outer plate 64 to inner plates 75 and 77, respectively. Upper flange 66 spans the length of side channel 60. Lower flange 67 extends from stiffening flange 72 to stiffening flange 73. The front and rear ends 61 and 62 of upper flange 66 and end flanges 70 and 71 are thicker to accommodate the higher forces in these areas of channel 60.

Left side channel 80 is shown in FIG. 6. Channel 80 is the mirror image of channel 60. The channel 80 is an integral piece of material with front and rear ends 81 and 82. A first pocket 83 is machined out of the inside surface of channel 80 for snugly receiving the left side 43 of pedestal top 41. Channel 80 is machined to form a rectangular outer plate 84 from which a number of inwardly projecting flanges extend, such as upper flange 86, a lower flange 87, middle flanges 88 and 89, end flanges 90 and 91, and stiffening flanges 92 and 93. Outer plate 84 combines with upper flange 86, middle flanges 87 and 88, and end flange 90 and 91 to snugly receive pedestal top 41. A second pocket 94 is machined out of a lower surface of the front end 81 of channel 80 to form a downwardly projecting inner plate 95 as shown in FIG. 8. A third pocket 96 is machined out of the lower surface of the rear end 81 of channel 80 to form a downwardly projecting inner plate 97 as shown in FIG. 7. The second and third pockets 94 and 96 are sized to snugly receive unibody leg 130 and multi-strip leg 110, respectively. Outer plate 84 has one hole in each of its ends 81 and 82, each hole being linearly aligned with a hole in inner plate 95 or 97, respectively. A bolt 98 is inserted through each hole to pivotally secure legs 110 and 130 in place. A fourth pocket 79 is machined out of the inside surface of channel 80 to reduce the weight of the channel. Stiffening flanges 92 and 93 join outer plate 84 to inner plates 95 and 97, respectively.

As shown in FIGS. 5–9, the pedestal 40 is mounted to the aircraft floor 11 via supports or legs 100, 110, 120 and 130. Rear supports 100 and 110 are each composed of one multi-strip leg but, as is discussed more fully below, may include a sacrificial multi-strip leg 111 as in FIG. 6. Front supports 120 and 130 are each formed by a single unibody leg. Gussets 140 and 150 are provided to stabilize the legs.

The multi-strip legs 100 and 110 are formed by a plurality of substantially flat flex straps 160 having rounded top and bottom ends 161 and 162 and an elongated middle section 163. Each multi-strip leg 100 and 110 contains about eight flex straps 160. A flat surface formed by the width and length of each flex strap 160 lays against the flat surface of each adjacent flex strap through the entire length of the flex strap. The flex straps 160 are stacked one next to the other. The perimeter of each flex strap 160 is flush with the perimeter of the other flex straps. The flex straps are aligned so that their flat surfaces are perpendicular to the path of travel 12 of the aircraft and seat 10. The flat surfaces are parallel to the outer plate 64 or 84 of their respective channel 60 or 80. As will be discussed in more detail below, there are preferably eight flex straps 160 per leg 100 and 110 to provide sufficient strength and to provide redundancy in the event that one or two of the flex straps break during the emergency landing. The remaining unbroken flex straps 160 should be capable of supporting the aircraft seat 10 and securing it to the aircraft floor 11.

Each flex strap 160 is made of 2024-T3 aircraft grade aluminum and is preferably about 1/16 inch thick and about 3/8 inch wide at its middle section 163. The top and bottom ends 161 and 162 of the flex straps 160 have a width that is slightly greater than 3/8 inch to accommodate a 1/4 inch hole formed in each end for receiving either 78 or 189. The flex straps 160 are roughly four inches in length, but this length may vary for different aircraft seats 10. Different aircraft seats 10 require pedestals 40 of different heights. It should be understood that more or fewer than eight flex straps 160 could be used per multi-strip leg 100 and 110, and that the flex straps could have different thicknesses and widths without departing from the invention.

The multi-strip legs 100 and 110 are installed so that the width of the individual flex straps 160 are substantially parallel to the path of travel 12 of the aircraft. As best seen in FIG. 9, the top ends 161 of flex straps 160 forming multi-strip legs 100 and 110 are inserted between outer and inner plates 64 and 77 of side channel 60 or outer or inner plates 84 and 97 of side channel 80, respectively. As previously mentioned, the flex strap holes are aligned with the outer and inner plate holes, and pivotally secured in place by either bolt 78 or 98. Similarly, the bottom end 162 of the flex straps forming multi-strip legs 100 and 110 are pivotally secured to hinged floor mount assembly 180 by bolt 189 as discussed below. Bolts 78, 98 and 189 are positioned substantially perpendicular to the direction of travel 12 of the aircraft so that the top and bottom ends 161 and 162 of the flex straps 160 pivot in roughly the same direction of travel 12 as the aircraft.

Unibody legs 120 and 130 are each made of an integral piece of 2024-T3 aircraft grade aluminum that is formed into an asymmetrical Y-shape as shown in FIG. 8, one leg of the Y being substantially aligned with a straight lower part, and the other leg substantially parallel but offset. The length of unibody legs 120 and 130 is roughly the same as multi-strip legs 100 and 110. The unibody legs 120 and 130 have a uniform width of about 1/2 inch. Each unibody leg 120 and 130 has a thickness of about 1/2 inch at its bottom end 121 or 131, and an overall thickness of about one inch at its top end 122 or 132. The top end 122 or 132 of each leg 120 and 130 has a hole for pivotally securing the leg to outer and inner plates 64 and 75 of side channel 60 or outer and inner plates 84 and 95 of side channel 80, by bolt 78 and 98, respectively. Similarly, the bottom end 121 or 131 of each leg 120 and 130 has a hole for pivotally securing the leg to its respective hinged floor mount assembly 180 as discussed below. The top and bottom ends 121, 122, 131 and 132 of the unibody legs 120 and 130 pivot in the direction of travel 12 of the aircraft.

The bottom end 162 of each flex strap that forms multi-strip legs 100 and 110 and each unibody leg 120 and 130 is secured to a hinged floor mount assembly 180 that includes a floor mount 181, hinge 182 and coupling bolt 183. As best seen in FIGS. 5 and 6, each floor mount 181 has four linearly aligned, upwardly projecting, spaced apart loops. Each hinge 182 has a pair of linearly aligned, downwardly projecting, spaced apart loops that mate with the floor mount loops so that coupling bolt 183 can be inserted through each loop to hingably join the two pieces together.

As best seen in FIGS. 7 and 8, each floor mount 181 has a base 186 that is rigidly bolted or otherwise secured to the aircraft floor 11. Each hinge 182 has a pair of upwardly projecting, spaced apart flanges 187 and 188 for receiving the bottom end 121 or 131 of one unibody leg 120 or 130 or the bottom end 162 of the flex straps forming multi-strip legs 100 or 110. However, it should be understood that the hinge flanges 187 and 188 can be shaped to accommodate more than one leg, such as legs 110 and 111 in FIG. 5. Each hinge flange 187 and 188 has a hole that is linearly aligned with the hole in the other flange. The holes in the bottom end 121 or 131 of legs 120 or 130 or the bottom end 162 of the flex straps 160 forming multi-strip legs 100 or 110 are aligned with the holes in hinge flanges 187 and 188, and pivotally secured to hinge 182 by bolt 189. Hinge flange holes, unibody leg holes and flex strap holes are each about 1/4 inch in diameter.

Gussets 140 and 150 are made of 7075-T6 alclad aluminum sheet metal. The gussets 140 and 150 are about 1/16 thick, but the thickness may vary depending on the characteristics of the particular aircraft seat 10 in which they are installed. The forward and rearward ends 141, 142, 151 and 152 of each gusset 140 and 150 are bent inwardly to provide additional strength. Bolts 78 and 145 or bolts 98 and 155 rigidly secure the top ends 143 and 153 of gussets 140 and 150 to the front end 61 or 81 of the outer plate 64 or 84 of side channel 60 or 80, respectively. Bolts 189 and 204 rigidly secure the bottom end 144 and 154 of gussets 140 and 150 to the hinges 182 of hinged floor mount assembly 180. The gussets 140 and 150 stabilize legs 100, 110, 120 and 130 and maintain the pedestal top 41 in its intended position 250 during normal operation of the aircraft. The gussets 140 and 150 prevent the legs 100, 110, 120, 130 from pivoting about bolts 78, 98 and 189, at least until forces of a given magnitude, such as those in and emergency landing, cause the pedestal 40 to deform into an energy absorbing position 260 as shown in FIGS. 19-21.

Radius blocks 200 are provided to help control the forward bending of legs 100, 110, 120 and 130. This forward bending aids in reducing the forces caused by a sudden deceleration of the aircraft that would otherwise be imparted on the occupant. The radius blocks 200 provide an arcuate surface 202 around which the legs 100, 110, 120 and 130 can bend, and help prevent excessive bending in any single location along the length of legs. Excessive bending in any single location can cause the legs 100, 110, 120 and 130 to break. The radius blocks 200 are robustly sized to maintain their shape during an emergency landing. A bolt 204 is used to secure each radius block 200 to its respective hinge 180. Each radius block 200 is located in front of its respective leg 100, 110, 120 or 130 so that its arcuate surface 202 abuts the forwardly facing surface of its respective leg. This abutment facilitates the initial bending of legs 100, 110, 120 and 130 in a predetermined area of each leg corresponding to the arcuate surface 202 of its radius block 200.

When two multi-strip legs 110 and 111 are provided to support a single corner of the pedestal 40 as in FIG. 5, the radius block 200 may be eliminated from the rear most multi-strip leg 100. Multi-strip leg 111 is similar in construction to multi-strip legs 100 and 110. Multi-strip leg 111 is also pivotally secured to side channel 60 or 80 and hinge 182 similar to multi-strip legs 100 and 110. A radius block in the form of a bolt 205 is provided to abut the forwardly facing surface of the forward most multi-strip leg 111. The relatively small diameter of the bolt 205 will aid in reducing some deceleration forces during an emergency landing condition, but will ultimately cause leg 111 to be sacrificed due to excessive bending of the leg in the location of the bolt. It should be understood that the radius blocks 200 and 205 could be mounted on the side channels 60 and 80 of the pedestal 40 in lieu of the hinges 182 without departing from the invention. In this arrangement, the Y-shaped unibody legs 120 and 130 would be inverted so that the radius blocks 200 continue to engage the bottom ends 121 and 131 of the legs.

Figure 10:
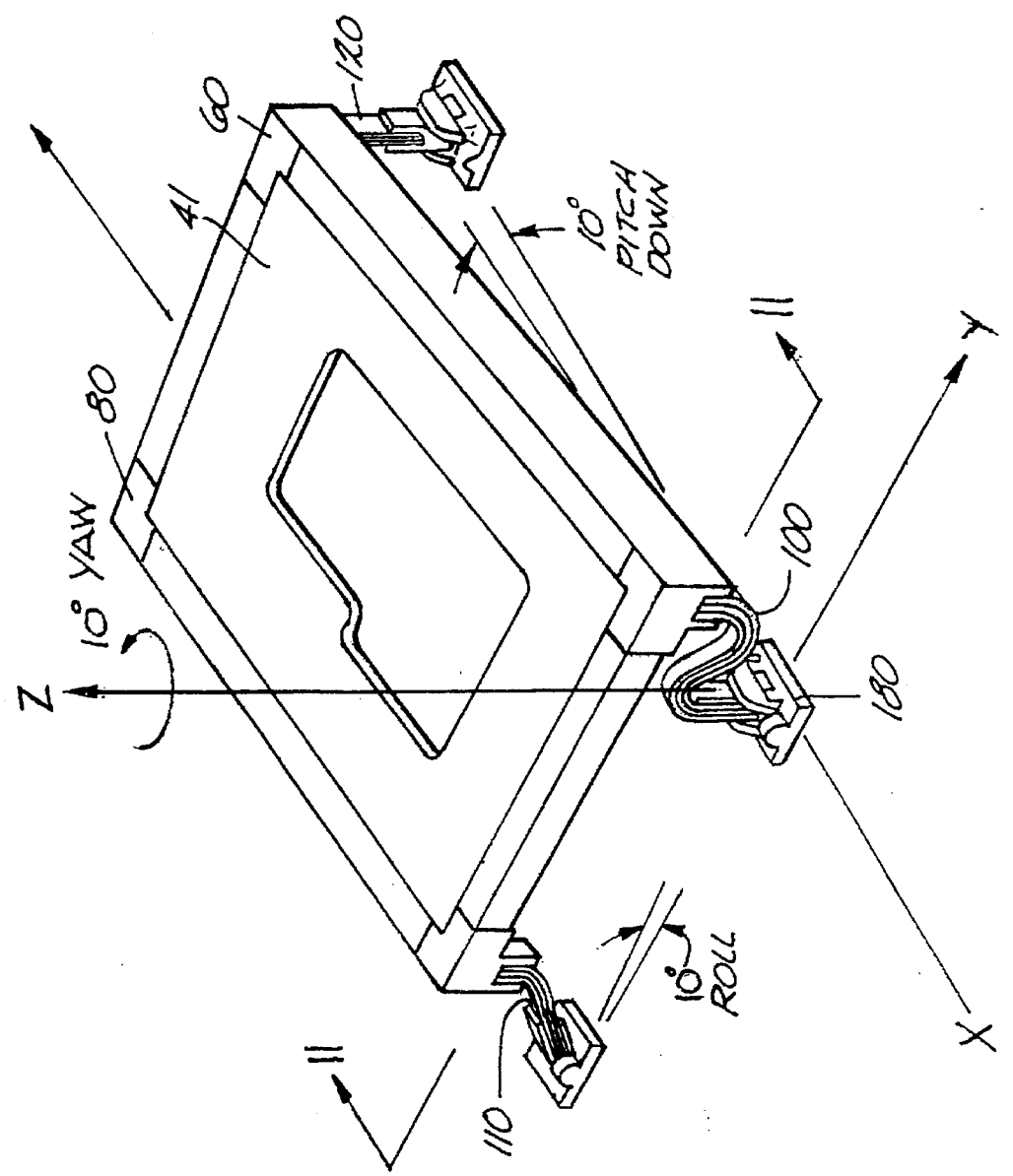
FIG. 10 is a perspective view of the pedestal mounted on a test sled just prior to performing an impulse test that simulates an emergency landing, the leg mounts having been rolled, pitched and yawed to simulate aircraft floor warpage.
Figure 11:
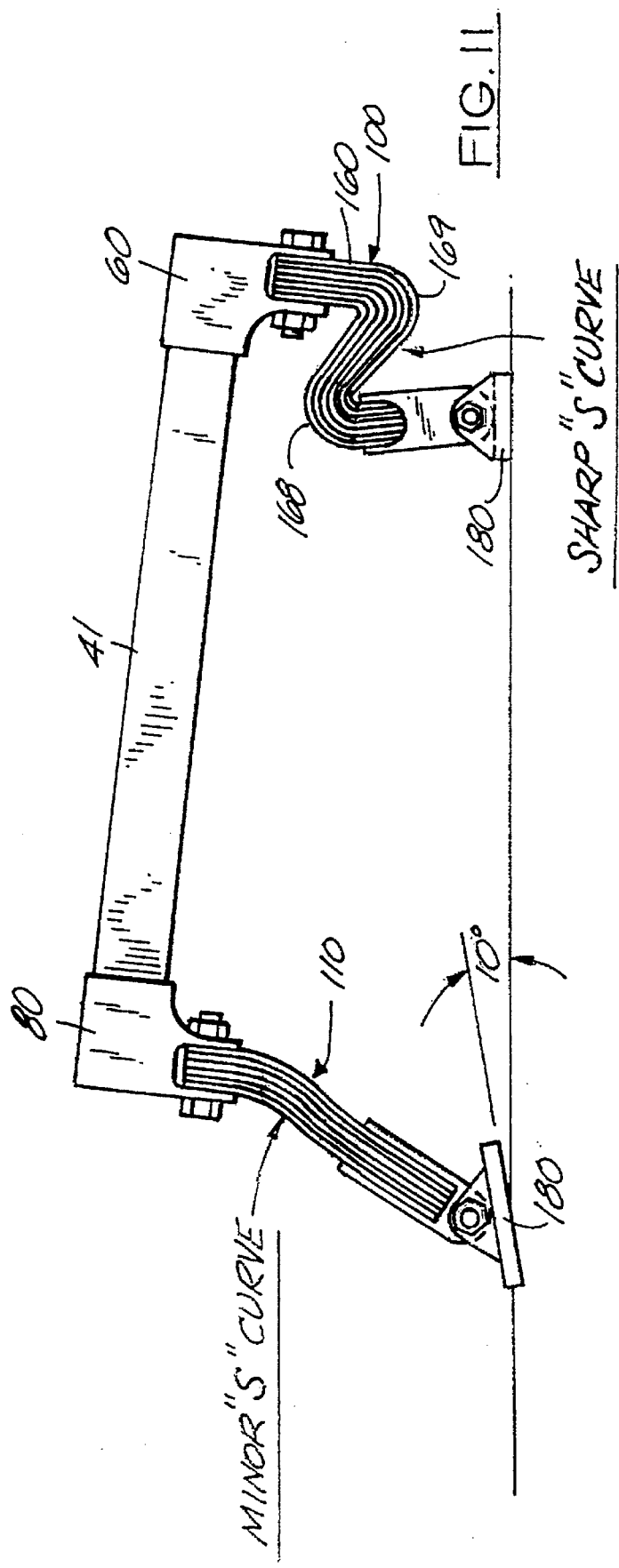
FIG. 11 is a rear elevation view of the pedestal of FIG. 10 showing the extreme bending of the right multi-strip leg.

FIGS. 10 and 11 show the pedestal 40 as it would appear mounted on a test sled (not shown) just prior to conducting either of two simulated emergency landing impulse tests. The floor mounts of legs 100 and 120 are secured to a first sled track. The floor mounts for legs 110 and 130 are secured to a second sled track. Both tests are conducted with the seat 10 and pedestal 40 in its normal operating position 250. The first test or vertical test is conducted to determine the spine compression experienced by an occupant during a simulated emergency landing. In this test the entire seat 10 is pitched 60° to simulate the forces produced by an emergency landing. The second test or horizontal test is conducted to determine various belt forces and accelerations experienced by the occupant during a simulated emergency landing. The complete seat 10 and a test dummy are included during both tests. The seat 10 utilized in the tests is a C525 Cabin Seat manufactured by ERDA, Inc. of Peshtigo, Wis.

In accordance with Aerospace Standard SAE AS8049, the second test is conducted after the floor mounts 181 have been rolled and pitched to simulate floor warping of the aircraft, and the entire seat 10 is yawed. A first sled track holding floor mounts 180 of legs 110 and 130 is rolled 10° about what would be the x-axis of the aircraft. A second sled track is pitched 10° so that the floor mount 180 of unibody leg 120 is substantially lower than that of the floor mount 180 of multi-strip leg 100. This results in the buckling of multi-strip leg 100, which relieves the floor pre-loads and reduces the warping of the pedestal top 41. Given that the floor mounts are about thirteen inches apart, the change in height will be about 2¼ inches, or roughly 55 percent of the height of the 4 inch leg.

As is best shown in FIG. 11, the pitching of the floor mount 180 of unibody leg 120 causes multi-strip leg 100 to dramatically deform into an S-shape. This lateral bending aids in accommodating aircraft floor warpage that can cause the seat 10 to break free from the floor 11. When in this S-shape, the flex-straps 160 forming the inside of one of the two bends 168 act like a radius block for the outside flex-straps 169 forming that bend. About eight flex straps are preferred per multi-strip leg because under these extreme conditions the outside flex-straps 169 may break. Finally, both sled tracks are rotated 10° to simulate a 10° yaw in the aircraft on landing. It is under these conditions that a second of the two impulse tests is conducted.

Figure 12:
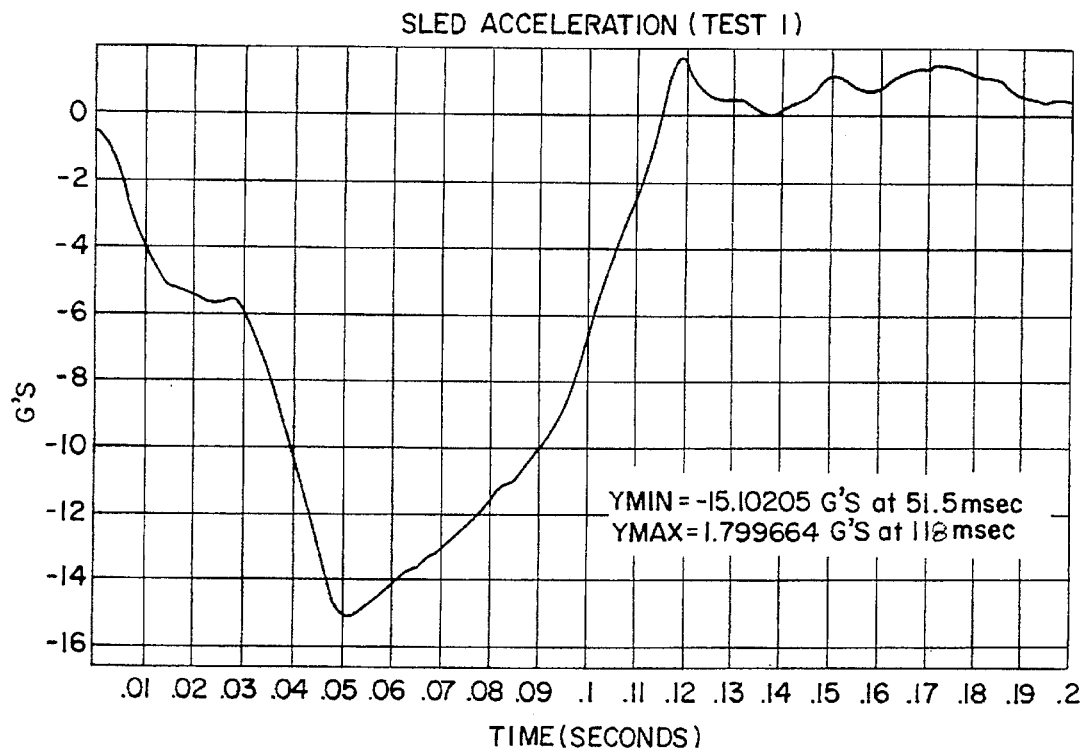
FIG. 12 is a graph of a first sled acceleration test showing an impact pulse curve and G-forces imparted on the aircraft seat during this first simulated emergency landing.
Figure 13:
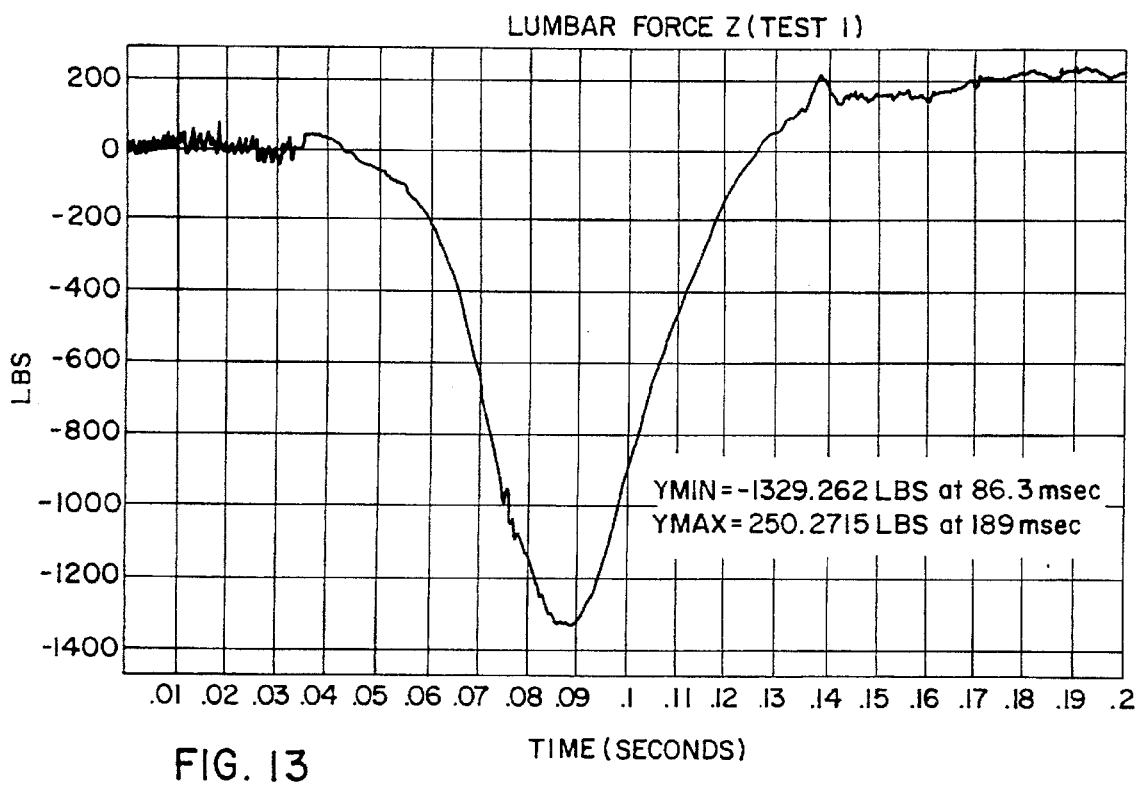
FIG. 13 is a graph of the lumbar forces experienced by an occupant of the aircraft seat during the first test.
Figure 14:
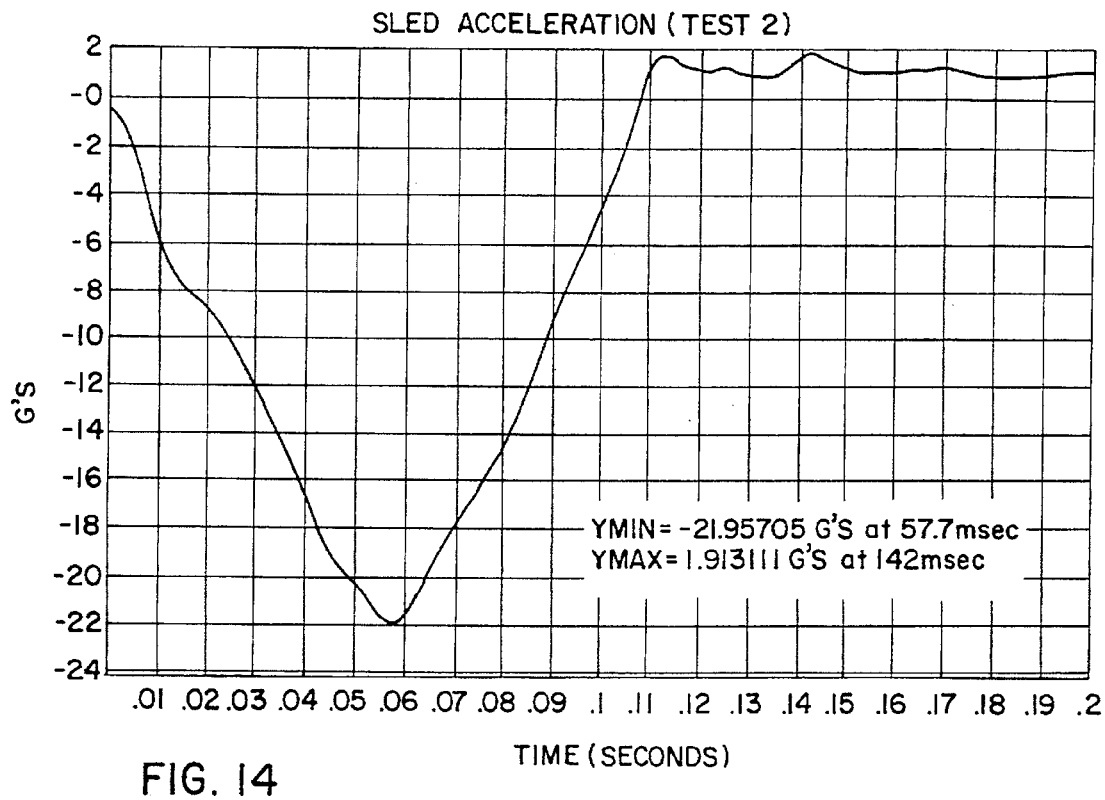
FIG. 14 is a graph of a second sled acceleration test showing an impact pulse curve and G-forces imparted on the aircraft seat during this second simulated emergency landing.

As discussed above, FIGS. 12–18 are illustrative graphs of sample results obtained during two tests of the aircraft seat 10 equipped with pedestal 40. FIGS. 12 and 13 show the sled acceleration and lumbar force curves for a first test. The test reveals the simulated compression forces occurring on the spine of a person sitting in the aircraft seat 10 during an emergency landing. Aerospace Standard SAE AS8049 requires a maximum spine compression force of 1,500 pounds for an impulse curve having a peak acceleration of 15 Gs (15 times the force of gravity). As shown in FIGS. 12 and 13, the test sled achieved a peak acceleration of 15.1 Gs while the test dummy experienced a maximum compressive force of about 1,329 pounds in its lumbar region.

Figure 15:
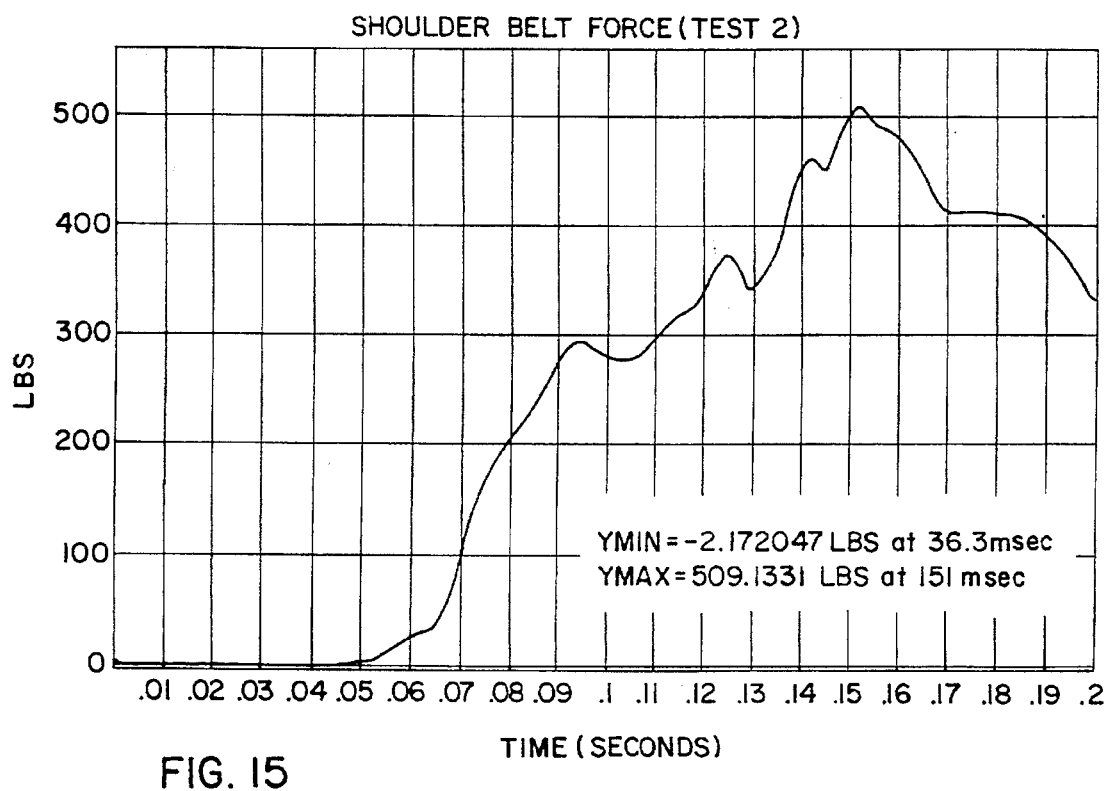
FIG. 15 is a graph of the shoulder belt forces experienced by an occupant of the seat during the second test.
Figure 16:
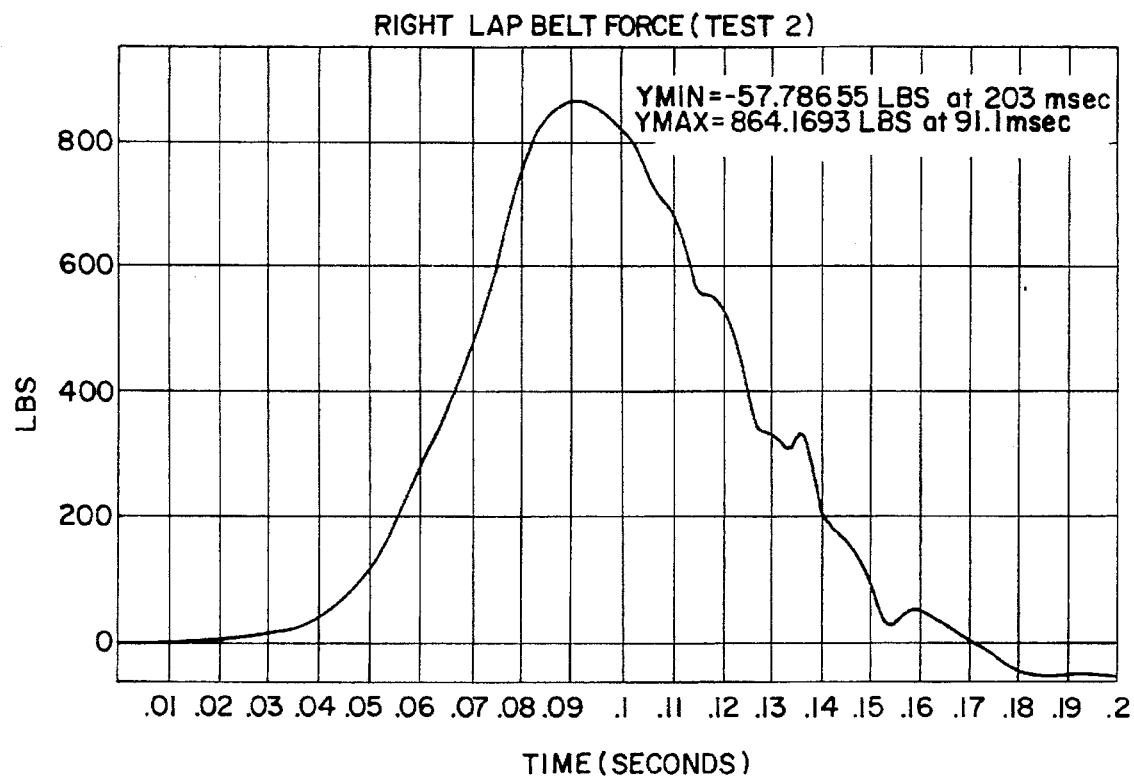
FIG. 16 is a graph of the right lap belt forces experienced by an occupant of the seat during the second test.
Figure 17:
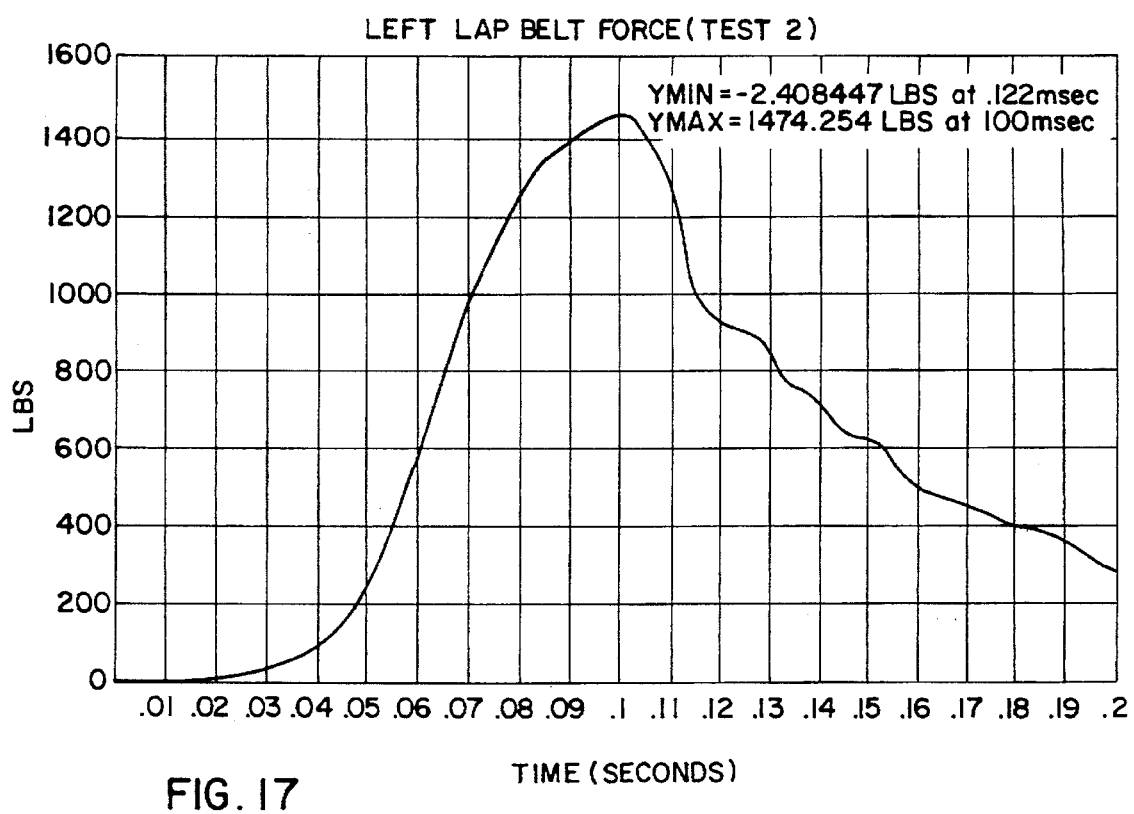
FIG. 17 is a graph of the left lap belt forces experienced by an occupant of the seat during the second test.
Figure 18:
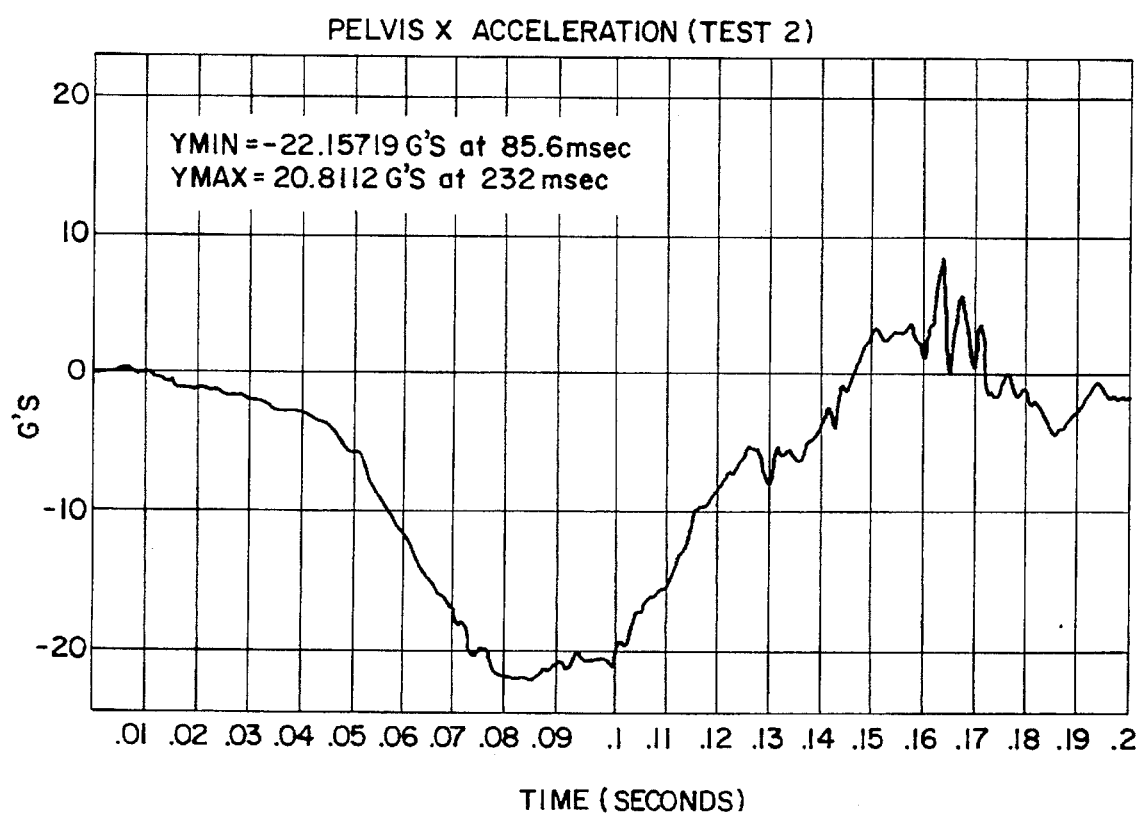
FIG. 18 is a graph of the pelvis accelerations experienced by an occupant of the seat during the second test.

FIGS. 14–18 show the respective sled acceleration curve, shoulder and lap belt force curves and pelvis acceleration curve for a second test. The test reveals the simulated belt forces and pelvis accelerations imparted on a person sitting in the aircraft seat 10 during the simulated emergency landing having the impulse curve shown in FIG. 14. The maximum shoulder belt force was about 509 pounds as shown in FIG. 15. The maximum right lap belt force was about 864 pounds as shown in FIG. 16. The maximum left lap belt force was about 1474 pounds as shown in FIG. 17. The maximum upward and downward pelvis accelerations were about 21 and 22 Gs, respectively, as shown in FIG. 18.

FIGS. 19–21 show an example of the deformed pedestal 40 after completion of the second simulated emergency landing impulse test. As best shown in FIG. 19, the pedestal top 41 has shifted longitudinally forward and down from its normal position 250 to an energy absorbing position 260. The pivotal securement of the legs 100, 111, 110, 120 and 130 facilitates the movement of the pedestal top 41 to this energy absorbing position 260. Leg 100, 110, 120 and 130 are bent around radius blocks 200. Gussets 140 and 150 are crushed. Leg 110 has straightened out somewhat from its previous S-shape. As best seen in FIGS. 20 and 21, pedestal top 41 and the top end of legs 100, 110, 120 and 130 are shifted laterally to the right. The combination of the longitudinal, lateral and downward deformation of the legs aids in absorbs some of the energy that would otherwise be imparted on the occupant of seat 10.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

Having described our new invention, what we claim is new and desire to secure by Letters Patent is:

1. A force dissipation seat pedestal for supporting a seat and an occupant, the pedestal comprising:

a top portion adapted to support the seat, the top portion having a front end and a rear end; and, a plurality of legs adapted to support the top portion of the pedestal, at least one of the plurality of legs being a multi-strip leg formed by at least three flex straps, each flex strap having a surface and first and second ends, the first end being secured to the rear end of the top portion and the second end being secured to a supporting surface, the multi-strip leg plastically deforming under predetermined conditions to accommodate warping of the supporting surface between the legs and to dissipate some of the energy and forces that would otherwise be imparted on the occupant of the seat during an emergency condition.

2. The force dissipation seat pedestal of claim 1, and wherein each flex strap has a surface that lays flat against the surface of its adjacent flex strap.

3. The force dissipation seat pedestal of claim 2, and wherein at least one of the plurality of legs is a unibody leg having first and second ends, the first end being secured to the top portion and the second end being secured to the supporting surface, the unibody leg deforming under predetermined conditions to dissipate some of the energy and forces that would otherwise be imparted on the occupant of the seat.

4. The force dissipation seat pedestal of claim 3, and wherein the first end of each unibody and multi-strip leg is pivotally secured to the top portion, and the second end of each unibody and multi-strip leg is pivotally secured to the supportable surface.

5. The force dissipation seat pedestal of claim 4, and further comprising a gusset with a top end secured to the top portion of the pedestal for maintaining the top portion in a normal operating position during normal conditions.

6. The force dissipation seat pedestal of claim 5, and wherein the top portion is a pedestal top having a honeycomb core.

7. The force dissipation seat pedestal of claim 6, and further comprising first and second side channels, the first side channel being rigidly secured to a first side of the pedestal top and the second side channel being rigidly secured to a second side of the pedestal top.

8. The force dissipation seat pedestal of claim 7, and wherein the first side channel is rigidly secured to the a right side of the pedestal top and the second side channel is rigidly secured to a left side of the pedestal top, and wherein a first unibody leg is pivotally secured to a front end of the right side channel and a second unibody leg is pivotally secured to a front end of the left side channel, and wherein a first multi-strip leg is pivotally secured to a rear end of the right side channel and a second multi-strip leg is pivotally secured to a rear end of the left side channel.

9. The force dissipation seat pedestal of claim 8, and wherein the flex straps are substantially parallel to the side channels.

10. The force dissipation seat pedestal of claim 9, and further including a plurality of floor mounts and hinges, each floor mount being rigidly secured to the supporting surface and each hinge being hingably secured one of the floor mount, the lower end of each leg being pivotally secured to one of the hinges.

11. The force dissipation seat pedestal of claim 1, and wherein the seat pedestal is adapted for use in an aircraft seat capable of undergoing a simulated emergency landing test conducted pursuant to Aerospace Standard SAE AS 8049 issued July, 1990 and having an impulse curve with a peak acceleration of at least 15 Gs and a spine compression of less than 1500 pounds on the occupant of the seat.

12. The force dissipation seat pedestal of claim 1, and wherein the seat pedestal is adapted for use in an aircraft seat capable of undergoing a simulated emergency landing test conducted pursuant to Aerospace Standard SAE AS 8049 issued July, 1990 and having an impulse curve with a peak acceleration of at least 15 Gs and shoulder belt forces of less than 1750 pounds on the occupant of the seat.

13. A force dissipation seat pedestal for supporting a seat and an occupant, the pedestal comprising:

a pedestal top having right and left sides and a honeycomb core, the pedestal top being adapted to support the seat;

right and left side channels, the right side channel being rigidly secured to a right side of the pedestal top, and the left side channel being rigidly secured to a left side of the pedestal top;

right and left unibody legs, each leg having top and bottom ends, the top end of the right unibody leg being pivotally secured to the right side channel and the bottom end of the right unibody leg being pivotally secured to a supporting surface, and the top end of the left unibody leg being pivotally secured to the left side channel and the bottom end of the left unibody leg being pivotally secured to a supporting surface;

right and left multi-strip legs, each multi-strip leg being formed by a plurality of flex straps having first and second ends, each flex strap having a surface that lays flat against the surface of its adjacent flex strap, the flex straps being substantially parallel to the their respective side channel, and wherein the top end of the right multi-strip leg is pivotally secured to the right side channel and the bottom end of the right multi-strip leg is pivotally secured to the supporting surface, and the top end of the left multi-strip leg is pivotally secured to the left side channel and the bottom end of the right multi-strip leg is pivotally secured to the supporting surface; and, a gusset with a top end secured to the pedestal top for maintaining the top portion in a normal operating position during normal conditions, the unibody legs, multi-strip legs and gussets deforming under predetermined conditions to dissipate some of the energy and forces that would otherwise be imparted on the occupant of the seat.

14. The force dissipation seat pedestal of claim 13, and further including a floor mount that is rigidly secured to the supporting surface and a hinge that is hingably secured to the floor mount and pivotally secured to the lower end of each leg.

15. The force dissipation seat pedestal of claim 14, and wherein the seat pedestal is capable of undergoing a simulated emergency landing test conducted pursuant to Aerospace Standard SAE AS 8049 issued July, 1990 and having an impulse curve with a peak acceleration of at least 15 Gs and a spine compression of less than 1500 pounds and shoulder belt loads of less than 1750 pounds on the occupant of the seat.

16. A force dissipation seat for supporting an occupant of an aircraft comprising:

a cushion portion adapted to support the occupant;

a seat pan adapted to support the cushion portion of the seat;

a pedestal top adapted to support the seat, the pedestal top having a front end and a rear end;

a plurality of legs adapted to support the pedestal top, at least one of the plurality of legs being a multi-strip leg formed by at least three flex straps, each flex strap having a surface and first and second ends, the first end being secured toward the rear end of the pedestal top and the second end being secured to a supporting surface, the multi-strip leg plastically deforming under predetermined conditions to accommodate warping of a supporting surface between the legs and to dissipate some of the energy and forces that would otherwise be imparted on the occupant of the seat during an emergency condition.

17. The force dissipation seat pedestal of claim 16, and wherein each flex strap has a surface that lays flat against the surface of its adjacent flex strap.

18. The force dissipation seat pedestal of claim 19, and wherein at least one of the plurality of legs is a unibody leg having first and second ends, the first end being secured to the pedestal top and the second end being secured to a supporting surface.

19. The force dissipation seat pedestal of claim 18, and wherein the unibody and multi-strip legs are pivotally secured to the top portion and the supportable surface.

20. The force dissipation seat pedestal of claim 19, and further comprising a gusset for maintaining the top portion in a normal operating position during normal conditions.

21. The force dissipation seat pedestal of claim 20, and wherein the top portion is a pedestal top having a honeycomb core.

22. The force dissipation seat pedestal of claim 21, and further comprising first and second side channels, the first side channel being rigidly secured to a first side of the pedestal top and the second side channel being rigidly secured to a second side of the pedestal top.

23. The force dissipation seat pedestal of claim 22, and wherein the first side channel is rigidly secured to the a right side of the pedestal top and the second side channel is rigidly secured to a left side of the pedestal top, and wherein a first unibody leg is pivotally secured to a front end of the right side channel and a second unibody leg is pivotally secured to a front end of the left side channel, and wherein a first multi-strip leg is pivotally secured to a rear end of the right side channel and a second multi-strip leg is pivotally secured to a rear end of the left side channel.

24. The force dissipation seat pedestal of claim 23, and wherein the flex straps are substantially parallel to the side channels.

25. The force dissipation seat pedestal of claim 24, and further including a floor mount that is rigidly secured to the supporting surface and a hinge that is hingably secured to the floor mount and pivotally secured to the lower end of each leg.

26. The force dissipation seat pedestal of claim 25, wherein the seat is capable of undergoing a simulated emergency landing test conducted pursuant to Aerospace Standard SAE AS 8049 issued July, 1990 and having an impulse curve with a peak acceleration of at least 15 Gs and a spine compression of less than 1500 pounds, and shoulder belt loads of less than 1750 pounds on the occupant of the seat.

* * * * *